United States Patent [19]

Tsuchiya et al.

[11] Patent Number: 5,114,338

[45] Date of Patent: May 19, 1992

[54] FURNACE FOR HEATING HIGHLY PURE QUARTZ PREFORM FOR OPTICAL FIBER

[75] Inventors: Ichiro Tsuchiya; Shinji Ishikawa; Masahide Saitoh; Yoichi Ishiguro, all of Yokohama, Japan

[73] Assignee: Sumitomo Electric Industries, Ltd., Osaka, Japan

[21] Appl. No.: 673,870

[22] Filed: Mar. 22, 1991

Related U.S. Application Data

[63] Continuation of Ser. No. 469,914, Jan. 22, 1990, abandoned.

[30] Foreign Application Priority Data

Jan. 23, 1989 [JP] Japan ..................... 1-14628

[51] Int. Cl.⁵ .................... C03B 37/00; C03B 37/14; C03B 20/00
[52] U.S. Cl. ..................... 432/206; 432/208; 432/239; 432/244; 65/157; 65/13
[58] Field of Search .......... 432/206, 208, 244; 65/157, 13

[56] References Cited

FOREIGN PATENT DOCUMENTS

| | | |
|---|---|---|
| 0302121 | 2/1989 | European Pat. Off. . |
| 2340519 | 9/1977 | France . |
| 8806145 | 8/1988 | PCT Int'l Appl. ............ 65/157 |
| 1575299 | 9/1980 | United Kingdom . |

OTHER PUBLICATIONS

Tsunehisa Kyodo "Heating Oven for Optical Fiber . . . ", Patent Abstracts of Japan, Jun. 28, 1989, pp. (C-312) (3631).
Edahiro Takao "Optical Fiber Base Material Producing Furnace", Patent Abstracts of Japan, Apr. 10, 1980, (C-6) (528).
Kouzou Yoshimura "Production of Fibers for Optical Communication", Patent Abstracts of Japan, Jan. 26, 1979 (E-86) (39).
Yoichi Ishiguro "Production of Glass Article", Patent Abstracts of Japan, Mar. 29, 1988 (c-484) [2943].
Yoichi Ishiguro, "Production of High-Purity Transparent Glass", Patent Abstracts of Japan, Dec. 21, 1988 C-554(3338).
Tsunehisa Kiyoudou "Manufacturing Apparatus of Base . . . ", Patent Abstracts of Japan, Nov. 29, 1984 (c-254) [1697].

*Primary Examiner*—Henry A. Bennet
*Assistant Examiner*—Christopher B. Kilner
*Attorney, Agent, or Firm*—Cushman, Darby & Cushman

[57] ABSTRACT

A heating furnace for heating a porous preform made of fine particles of highly pure quartz glass for an optical fiber, which furnace comprises a cylindrical furnace body, a heater installed in said furnace body and a muffle tube installed inside said heater to separate a heating atmosphere from said heater, wherein said muffle tube is made of highly pure carbon and coated with a gas impermeable carbon, which furnace prevents contamination of the preform with impurities and has long life.

12 Claims, 2 Drawing Sheets

FURNACE FOR HEATING HIGHLY PURE QUARTZ PREFORM FOR OPTICAL FIBER

This is a continuation of application Ser. No. 469,914, filed on Jan. 22, 1990, which was abandoned upon the filing hereof.

BACKGROUND OF THE INVENTION

1. Field of the Invention

The present invention relates to a furnace for heating a quartz preform for the fabrication of an optical fiber, and more particularly, to a furnace for heating a porous glass preform comprising quartz glass soot for the purpose of dehydration, addition of dopants and sintering to produce a highly pure quartz glass preform for the fabrication of an optical fiber.

The heating furnace of the present invention can prevent contamination of the preform with impurities and has good durability.

2. Description of the Related Art

To produce a glass preform for an optical fiber by the VAD method or the OVD method, it is necessary to dehydrate a glass soot preform formed by such method and then to densify and sinter the dehydrated soot preform. In some cases, fluorine, which is a dopant for adjusting a refractive index of the glass, is added in the dehydration step and/or the sintering step, or between the dehydration step and the sintering step. For dehydration, sintering and addition of fluorine, a heating furnace equipped with a muffle tube is used.

The conventional muffle tube is made of alumina (cf. Japanese Patent Publication No. 40096/1982 and U.S. Pat. No. 4,338,111) or quartz glass (cf. Japanese Patent Publication Nos. 58299/1983 and 42136/1983). With the muffle tube made of alumina, impurities such as alkali are liberated from the surface of the muffle tube so that the produced preform tends to be crystallized. Since the muffle tube made of quartz glass includes impurities such as copper or water, on one hand, the produced glass preform provides an optical fiber having increased optical absorbance, on the other hand, the muffle tube itself has unsatisfactory heat resistance.

To overcome the above problems, carbon is proposed as a material of the muffle tube used in the heating furnace (cf. WO88/06145, U.S. Pat. application Ser. No. 07/274,995 filed on Oct. 6, 1988 and EP-A1-0 302 121).

One of the conventional heating furnace is shown in FIG. 1. The heating furnace of this type comprises a cylindrical furnace body 5, and a muffle tube 3 which is inserted through the furnace body. A heater 4 is installed inside the furnace body. The furnace body 5 has an inlet 6 for an inert gas, and the muffle tube 3 has an inlet 7 for an atmospheric gas (e.g. $Cl_2$, $SiF_4$, He, etc.). The muffle tube 3 consists of an upper part 34, a middle part 35 and a lower part 36.

When the furnace is used, a porous soot preform 1 is supported in the muffle tube by means of a supporting rod 2 and heated.

The muffle tube disclosed in WO88/06145, U.S. Pat. application Ser. No. 07/274,995 filed on Oct. 6, 1988 and EP-A1-0 302 121 is characterized in that at least the inner layer consists of highly pure carbon. Examples of the disclosed designs of the muffle tube wall are as follows:

1. A silicon carbide or quartz wall having a highly pure carbon coating on the inner surface.

2. A highly pure carbon wall having a silicon carbide coating on the outer surface.

3. A wall consisting of an outer layer of silicon carbide and an inner layer of highly pure carbon.

However, each of these constructions has following drawbacks:

1. In the first design, the carbon coating tends to be peeled off or cracked because of difference of coefficients of thermal expansion between silicon carbide or quartz and highly pure carbon or weak bonding of the carbon coating to the silicon carbide or quartz wall. Since the quartz wall is softened and deformed at a temperature of 1500° C. or higher, it is impossible to maintain the bonding between the quartz wall and the carbon coating. Since the silicon carbide wall is corroded with chlorine gas ($Cl_2$) at a temperature of 900° C. or higher, the life of muffle tube is greatly shortened by treatment with the chlorine gas when the carbon coating is peeled off or cracked.

2. In the second design, since the highly pure carbon generally has gas permeability, a part of the atmospheric gas in the muffle tube reaches the silicon carbide layer. When the chlorine gas kept at a temperature of 900° C. or higher is used, silicon atoms are removed from the silicon carbide layer to leave a carbon layer. Since carbon layer formed through the removal of silicon atoms from the silicon carbide layer has a smaller density than a usual carbon layer, gasses can easily pass through the layer at high temperatures, whereby the glass preform is contaminated with the impurities present outside the muffle tube.

3. The third design has the same problems as those with the second design. In addition, the silicon carbide layer is not a coated material but made of a sintered material, it becomes brittle when it is corroded with the chlorine gas and its life is considerably shortened.

As explained above, with the muffle tube made of the conventional material, the preform should be heated at a limited temperature in a limited atmosphere. In addition, the muffle tube has short life.

SUMMARY OF THE PRESENT INVENTION

An object of the present invention is to provide a muffle tube to be used in a furnace for heating a glass preform for the fabrication of an optical fiber, which muffle tube can be used in a wide temperature range and has long life.

This and other objects of the present invention is accomplished by a heating furnace for heating a porous preform made of fine particles of highly pure quartz glass for an optical fiber, which furnace comprises a cylindrical furnace body, a heater installed in said furnace body and a muffle tube installed inside said heater to separate a heating atmosphere from said heater, wherein said muffle tube is made of highly pure carbon and coated with a gas impermeable carbon.

DETAILED DESCRIPTION OF THE DRAWINGS

Herein, the "heating" is intended to mean any treatment of the preform at a high temperature, for example, dehydration of the preform, addition of a dopant to the preform and sintering of the preform.

The "highly pure carbon" means carbon having a total ash content of not larger than 50 ppm, preferably not larger than 20 ppm.

In the heating furnace of the present invention, the gas impermeable carbon coating is provided on both the outer and inner surfaces of the muffle tube, although said coating may be provided on one of the outer and inner surfaces.

The gas impermeable carbon coating has a gas permeability of not more than $1 \times 10^{-4}$ cm$^2$/sec. (for nitrogen gas). The thickness of the carbon coating is not critical. To surely achieve the gas impermeability, the thickness is preferably not smaller than 1 μm.

The gas impermeable carbon coating can be formed from pyrolytic carbon or vitreous carbon. These carbon can form the highly pure coating.

The gas impermeable carbon coating may be formed on the surface of the muffle tube by any of conventional methods. For example, the pyrolytic carbon can be formed by heating a hydrocarbon such as methane and acetylene at a temperature of, for example, 1000° C.

In the muffle tube to be used according to the present invention, since the muffle body and the coated layer are both made of carbon, their thermal expansion characteristics can be made close so that the coated carbon is hardly or not peeled off or cracked. In addition, the muffle body and the coated carbon are not corroded with the chlorine gas even at high temperatures, or not deformed at a high temperature of 1500° C. or higher.

One of the common problems of the carbon made muffle tube is wearing due to oxidation of the carbon at a temperature of 400° C. or higher. The muffle tube of the present invention may suffer from such wearing. However, this problem can be solved by various measures as explained in below described Examples. Since the muffle tube of the present invention is highly resistant to oxidation, it has little limitation on the operation conditions and long life.

The present invention will be illustrated by making reference to the accompanying drawings.

Figure 2:
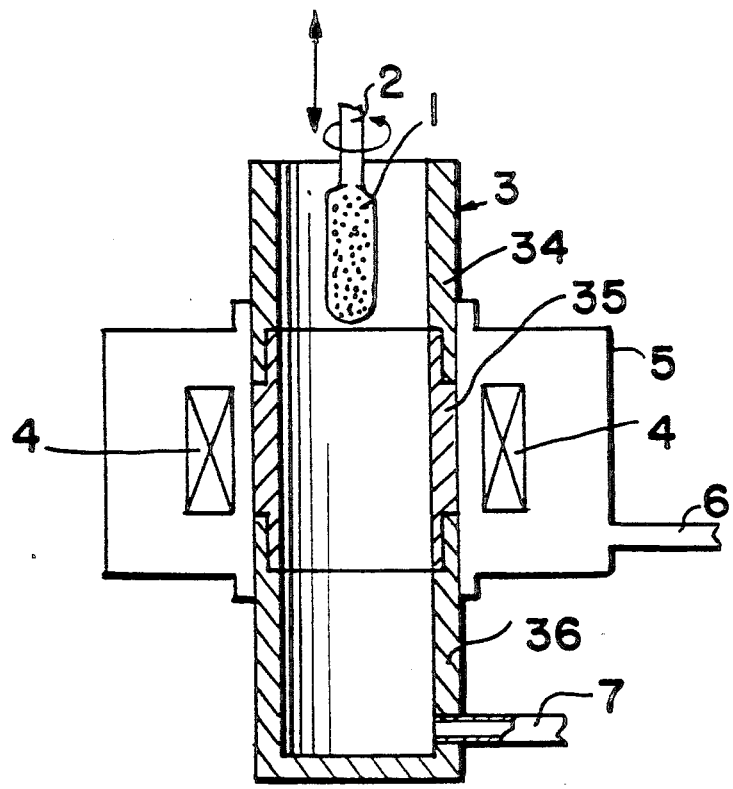

FIG. 2 schematically shows a cross section of a first embodiment of the heating furnace according to the present invention. The heating furnace of FIG. 2 comprises a cylindrical furnace body 5 and a muffle tube 3 which is installed inside the furnace body 5. Further, a heater 4 is provided between the furnace body 5 and the muffle tube 3. The furnace body 5 has an inlet 6 for an inert gas, and the muffle tube 3 has an inlet 7 for an atmospheric gas (e.g. Cl$_2$, SiF$_4$, He, etc.).

With the heating furnace of the present invention, a porous preform 1 attached to a supporting rod 2 is inserted in the muffle tube and heated.

Preferably, the muffle tube consists of three parts, namely an upper part 34, a middle part 35 and a lower part 36 in view of economy and production easiness. When the muffle tube is separated into three parts, the middle part which is more quickly worn than the upper and lower parts can be changed while leaving the upper and the lower parts unchanged.

Figure 1:
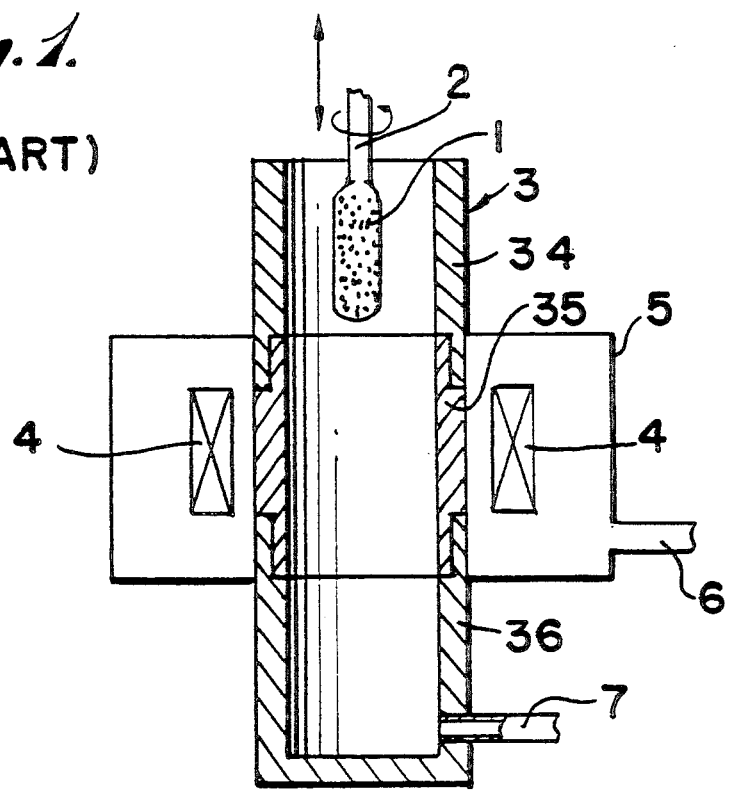
FIG. 1 schematically shows a cross section of one of the conventional heating furnace, FIGS. 2 to 5 schematically show various embodiments of the heating furnace of the present invention.

Differences of this heating furnace from that of FIG. 1 are that all of three parts 34, 35 and 36 are made of highly pure carbon and coated with the gas impermeable carbon coatings and that the furnace body is longer than that of the conventional furnace (of. FIG. 1) so that the furnace body can cover the part of outer wall of the muffle tube which is heated at a temperature of 400° C. or higher during heating operation.

Figure 3:
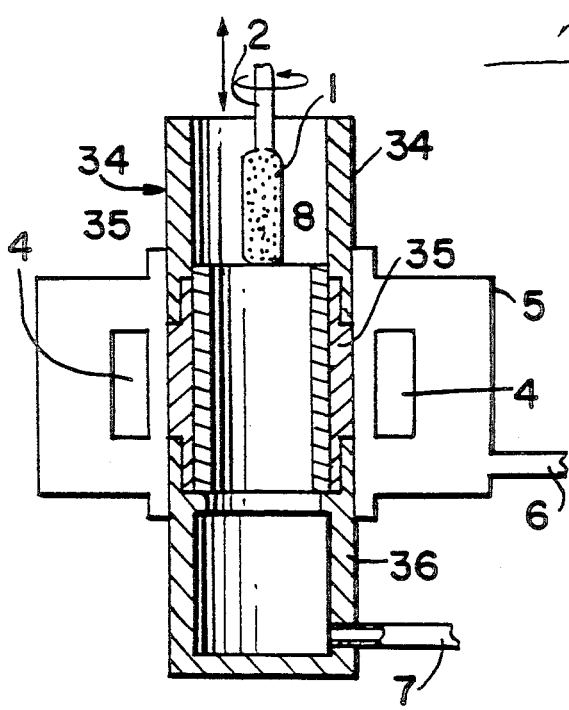

FIG. 3 schematically shows a cross section of a second embodiment of the heating furnace according to the present invention. In this embodiment, the muffle tube is coated with the gas impermeable coating and has an inner tube 8 made of highly pure carbon inside the middle part 35. Preferably, the inner tube 8 is inserted in the muffle tube 3 without leaving a gap between the inner tube and the muffle tube. Preferably, the inner tube has an outer diameter about 1 (one) mm smaller than an inner diameter of the muffle tube, whereby the inner tube is easily inserted in the muffle tube. Such diameter difference is sufficient to prevent the oxidation of the muffle tube. In this case, the inner tube 8 may be coated with the gas impermeable carbon.

Figure 4:
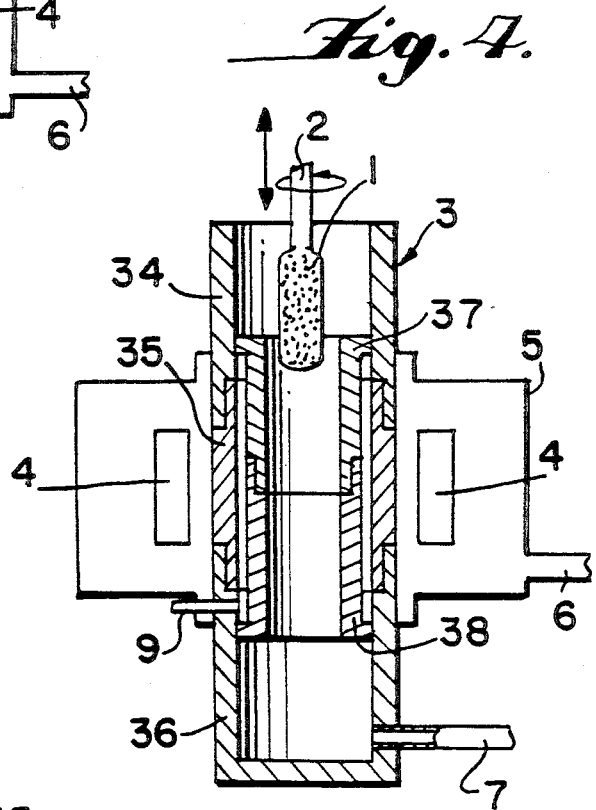

FIG. 4 schematically shows a cross section of a third embodiment of the heating furnace according to the present invention. In this embodiment, at least a middle portion of the muffle tube which is heated to 400° C or higher has a closed double wall structure an outer wall of which is composed of a part of the upper part 34, the middle part 35 and a part of the lower part 36 and an inner wall of which is composed of an upper inner wall 37 and a lower inner wall 38. The outer and inner walls define a closed space which communicates outside through an inlet 9 for the inert gas.

The inner walls 37 and 38 are made of highly pure carbon and may be coated with the gas impermeable carbon.

Figure 5:
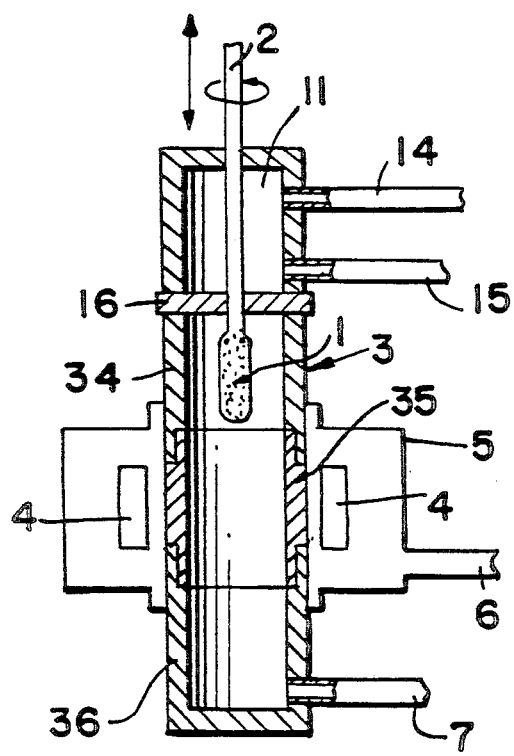

FIG. 5 schematically shows a cross section of a fourth embodiment of the heating furnace according to the present invention. This furnace is a modification of the furnace of FIG. 2 and has a front chamber 11. Namely, in addition to all the elements of the heating furnace of FIG. 2, this heating furnace comprises the front chamber 11, an outlet 14 for front chamber gas, an inlet 15 of a gas for purging the gas in the front chamber and a partition 16.

The front chamber is preferably made of a heat resistant material which liberates no impurities, such as quartz glass, SiC, Si$_3$N$_4$, BN and the like. In the heating furnace of FIG. 5, the muffle tube 3 may be replaced with that of FIG. 3 or FIG. 4.

Since the heating furnace of FIG. 2 does not use silicon carbide which is corroded with the chlorine gas at a temperature of 900° C. or higher or quartz glass which is softened at a temperature of 1500° C. or higher, it is stable and has long life. In addition, since the highly pure carbon material is coated with the gas impermeable carbon, impurities or water do not diffuse from the outside of the muffle tube into the inside of the muffle tube. Therefore, the highly pure quartz glass preform which is produced with the heating furnace of the present invention can provide the optical fiber having low light transmission loss.

When the corrosive gas such as the chlorine gas is used as the atmospheric gas in the muffle tube, the gas does not diffuse outside the muffle tube so that the furnace body is not corroded with the corrosive gas.

To prevent the wearing of the muffle tube through oxidation, the preform is inserted in or removed from the muffle tube at a muffle tube temperature of 400° C. or lower. During insertion and removal of the preform, the conventional muffle tube absorbs a considerable amount of oxygen or water since the highly pure carbon muffle tube is porous. Then, it takes a long time to replace the interior atmosphere of the muffle tube with the inert gas after insertion of the preform. In some cases, it is impossible to completely replace the interior atmosphere with the inert gas. In the present invention, since the carbon muffle tube is coated with the gas impermeable carbon, a slight amount of oxygen or water is absorbed by the muffle tube so that the time required for replacing the interior atmosphere with the inert gas can be shortened and the interior atmosphere can be completely replaced with the inert gas.

When the slight amount of oxygen or water is absorbed by the preform, since the coating is uniformly oxidized, no powder is generated while the highly pure carbon muffle tube having no coating generate powder through oxidation. Accordingly, the quartz glass preform produced with the heating furnace of the present invention provides an optical fiber having a fewer weak parts.

When the gas impermeable coatings are formed on both surfaces of the muffle tube, the outer coating keeps gas impermeability after the inner coating is worn out through oxidation. Since oxygen or water remaining in the interior space of the muffle tube reacts with the carbon of the muffle tube body when oxygen or water passes therethrough, the outer carbon coating is not or hardly worn. Therefore, the muffle tube of the present invention has very long life and stable and can be used under various heating conditions.

In the heating furnace of FIG. 3, the inner tube 8 protects the carbon coating on the inner surface of the muffle tube even when a slight amount of oxygen or water is liberated from the gas absorbed by the porous soot preform. That is, since the oxygen or water in the interior space of the muffle tube reacts with carbon of the inner tube 8 so that oxygen or water does not reach the inner surface of the muffle tube.

In the heating furnace of FIG. 4, the inert gas is introduced in the space between the outer and inner walls and the pressure in the space becomes positive. Since the inner walls 37 and 38 are made of carbon and a sintered carbon material produced by an isotropic molding has a gas permeability of about $10^{-1}$ cm$^2$/sec, the introduced inert gas passes through the pores of the carbon and flows into the interior space of the muffle tube. Since the atmosphere near the inner surface of the muffle tube is always rich in the inert gas, the inner surface of the muffle tube is not or hardly oxidized with the air which flows in during insertion and removal of the preform. Thereby, the quartz glass preform which is produced with the heating furnace of the present invention provides an optical fiber having a fewer weak parts.

When the preform is inserted in the heating furnace of FIG. 5, the partition 16 is closed and then the preform 1 is temporarily maintained in the front chamber 11. After replacing the atmosphere in the front chamber with the inert gas, the partition 16 is opened and the preform is lowered in the muffle tube 3, whereby the in-flow of the air into the muffle tube is prevented. Therefore, it is not necessary to lower the muffle tube temperature to 400° C. when the preform is inserted in or removed from the muffle tube.

The present invention will be illustrated by following Examples.

EXAMPLE 1

With the heating furnace of FIG. 2, a porous soot preform which had been produced by the VAD method was dehydrated, added with fluorine and sintered.

The muffle tube consisted of the body made of highly pure carbon all the surface of which was coated by pyrolytic carbon in a thickness of 30 μm. The treating conditions were as follows:

| Treatment | Atmosphere in furnace | Heater surface temperature (°C.) | Traversing rate (mm/min.) |
|---|---|---|---|
| Dehydration and removal of impurities | He 98%, Cl$_2$ 2% | 1100 | 6 |
| F-addition | He 97%, SiF$_4$ 3% | 1300 | 6 |
| Sintering | ↑ | 1600 | 6 |

By using the same muffle tube, 20 transparent glass preforms were produced.

Each transparent glass preform was bored to form a tubular cladding part. In the bore, a pure SiO$_2$ glass core rod was inserted and heated to collapse the cladding part onto the core rod. Around the collapsed cladding part, glass soot was deposited and sintered to form an outer layer. Then, the preform was drawn to fabricate a single mode optical fiber, which had good transmission loss of less than 0.19 dB/km at a wavelength of 1.55 μm.

The transparent glass having no outer layer was drawn to an outer diameter of 125 μm which is the same outer diameter of a usual optical fiber and subjected to a tensile test. More than 90% of the drawn fibers had tensile strength at break of more than 5.5 kg.

After the production of 20 transparent glass preforms, the muffle tube was detached and inspected. A part of the carbon coating on the inner surface at a center portion of the muffle tube was worn out and the surface of the muffle tube was partly exposed. However, no carbon powder was generated. The carbon coating on the outer surface of the muffle tube was intact.

EXAMPLE 2

In the same manner as in Example 1 except that the heating furnace of FIG. 4 was used, 20 transparent glass preform were produced. The outer walls 34 and 35 and the inner walls 37 and 38 were made of highly pure carbon, and all the surfaces of the outer walls were coated with pyrolytic carbon in a thickness of 30 μm. Helium gas was introduced through the inlet 9 at a flow rate of 5 liter/min.

As in Example 1, each of the transparent glass preforms was drawn to fabricate an optical fiber, which had good transmission loss of less than 0.19 dB/km at a wavelength of 1.55 μm. In the tensile test, more than 90% of the fibers had tensile strength at break of more than 5.5 kg.

After the production of 20 transparent glass preforms, the muffle tube was detached and inspected. None of the outer and inner surfaces of the outer walls was worn. The appearance of the highly pure carbon on the inner walls was not changed. No carbon powder was generated.

COMPARATIVE EXAMPLE

The heating furnace of FIG. 1 was used. The muffle tube was made of highly pure carbon and the outer surface of the tube was coated with SiC.

The same experiment as in Example 1 was repeated, and the data for the first ten preforms and those for the latter ten preforms were separately analyzed.

The transmission loss was less than 0.19 dB/km at a wavelength of 1.55 μm for all optical fibers fabricated from the first ten preforms, while it was more than 0.19 dB/km for two of the optical fibers fabricated from the latter ten preforms.

In the tensile test, more than 90% of the optical fibers fabricated from the first ten preform had tensile strength at break of more than 5.5 kg, while 70% of the optical fibers fabricated from the latter ten preform had tensile strength of more than 5.5 kg.

After the production of the preform, the muffle tube was detached and inspected. The SiC coating was discolored in the center portion of the outer surface of the muffle tube. The discolored part of the SiC coating was analyzed to find that SiC was changed to graphite. The highly pure carbon in the center portion of the inner surface was corroded and carbon powder was generated on the surface.

EXAMPLE 3

In the same manner as in Example 1 except that the heating furnace of FIG. 5 was used, 20 transparent glass preform were produced.

When the preform was inserted, the front chamber was purged for 20 minutes with nitrogen gas at a flow rate of 20 liter/min. while keeping the muffle tube temperature at 800° C. In Examples 1 and 2, the muffle tube was kept at 400° C. when the preform was inserted in the muffle tube.

The optical fibers fabricated from the produced preforms were examined in the same manner as in Example 1. The results were substantially the same as in Example 1.

The center portion of the muffle tube was worn but no carbon body was exposed.

What is claimed is:

1. A heating furnace for heating a porous preform made of fine particles of highly pure quartz glass for an optical fiber, which furnace comprises a cylindrical furnace body, a heater installed in said furnace body and a muffle tube installed inside said heater serving to separate a sealed inner atmosphere thereof from a sealed outer atmosphere thereof, wherein said muffle tube is made of highly pure carbon and includes an inner and an outer surface which are both coated with a gas impermeable carbon.

2. The heating furnace according to claim 1, wherein the gas impermeable carbon is one selected from the group consisting of pyrolytic carbon and vitreous carbon.

3. The heating furnace according to claim 1, wherein a part of the muffle tube which is heated to at least 400° C. has a closed double wall structure, an outer wall of which is made of highly pure carbon coated with the gas impermeable carbon and the inner wall of which is made of highly pure carbon.

4. The heating furnace according to claim 3, wherein the outer wall has an inlet through which an inert gas is supplied in a space of the double wall structure.

5. The heating furnace according to claim 1, which further comprises a front chamber in which the preform is temporarily stored before and after the preform is heat treated.

6. A heating furnace for heating a porous preform made of fine particles of highly pure quartz glass for an optical fiber, which furnace comprises a cylindrical furnace body, a heater installed in said furnace body and a muffle tube installed inside said heater serving to separate a sealed inner atmosphere thereof from a sealed outer atmosphere thereof, wherein said muffle tube is made of highly pure carbon and coated with a gas impermeable carbon, wherein an inner tube made of highly pure carbon is installed inside a part of the muffle tube which is heated to at least 400° C.

7. The heating furnace according to claim 6, wherein the inner tube is inserted in the muffle tube without leaving a gap between them.

8. The heating furnace according to claim 6, which further comprises a front chamber in which the preform is temporarily stored before and after the preform is heat treated.

9. A heating furnace for heating a porous preform made of fine particles of highly pure quartz glass for an optical fiber, which furnace comprises:
   a cylindrical furnace body;
   a heater installed in said furnace body; and
   a muffle tube installed inside said heater to separate a heating atmosphere from said heater, wherein said muffle tube is made of highly pure carbon and coated with a gas impermeable carbon, a part of the muffle tube which is heated to at least 400° C. has a closed double wall structure, an outer wall of which is made of highly pure carbon coated with the gas impermeable carbon and the inner wall of which is made of highly pure carbon.

10. The heating furnace according to claim 9, wherein the outer wall has an inlet through which an inert gas is supplied in a space of the double wall structure.

11. The heating furnace according to claim 7, which further comprises a front chamber in which the preform is temporarily stored before and after the preform is heat treated.

12. A heating furnace for heating a porous preform made of fine particles of highly pure quartz glass for an optical fiber, which furnace comprises:
   a cylindrical furnace body;
   a heater installed in said furnace body; and
   a muffle tube installed inside said heater serving to separate an inner sealed atmosphere thereof from an outer sealed atmosphere thereof, wherein said muffle tube is made of highly pure carbon and coated with a gas impermeable carbon, said furnace body further including a first inlet means communicating with a first gas supply, and said muffle tube further including a second inlet means communicating with a second gas supply.

* * * * *